United States Patent
Wellington (10) Patent No.: US 9,338,783 B2
(45) Date of Patent: May 10, 2016

(54) ALLOCATING REUSE CODES TO CELLS IN A COMMUNICATION NETWORK

(71) Applicant: EDEN ROCK COMMUNICATIONS, LLC, Bothell, WA (US)

(72) Inventor: Dan Wellington, Bothell, WA (US)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/459,146

(22) Filed: Aug. 13, 2014

(65) Prior Publication Data

US 2015/0208418 A1    Jul. 23, 2015

Related U.S. Application Data (60) Provisional application No. 61/929,449, filed on Jan. 20, 2014, provisional application No. 61/929,452, filed on Jan. 20, 2014.

(51) Int. Cl.
*H04W 72/04* (2009.01)
*H04L 1/00* (2006.01)

(52) U.S. Cl.
CPC .............. *H04W 72/0466* (2013.01); *H04L 1/00* (2013.01)

(58) Field of Classification Search
CPC .. H04B 7/0491; H04L 1/0009; H04L 5/0037; H04W 52/42; H04W 72/0466
See application file for complete search history.

(56) References Cited

U.S. PATENT DOCUMENTS

| | | | |
|---|---|---|---|
| 5,669,062 A | 9/1997 | Olds et al. | |
| 6,269,245 B1 | 7/2001 | Li et al. | |
| 8,504,086 B2 * | 8/2013 | So ......................... | H04W 24/02 455/411 |
| 8,717,887 B2 * | 5/2014 | Sarkar ................... | H04W 16/02 370/229 |
| 8,737,375 B2 * | 5/2014 | Puthenpura ........... | H04L 5/0053 370/252 |
| 2004/0087343 A1 * | 5/2004 | Lucidarme et al. ........ | 455/562.1 |
| 2004/0136343 A1 * | 7/2004 | Lee et al. ...................... | 370/335 |
| 2004/0203857 A1 * | 10/2004 | Wang ......................... | 455/456.1 |
| 2006/0039409 A1 * | 2/2006 | Lampinen ..................... | 370/474 |
| 2006/0255989 A1 * | 11/2006 | Kim et al. ..................... | 341/120 |
| 2007/0053319 A1 | 3/2007 | Hulbert | |
| 2009/0163237 A1 | 6/2009 | Abedi | |
| 2014/0029521 A1 * | 1/2014 | Puthenpura et al. .......... | 370/329 |
| 2014/0228064 A1 * | 8/2014 | Puthenpura ........... | H04L 5/0053 455/501 |
| 2015/0156697 A1 * | 6/2015 | Chen et al. | |

FOREIGN PATENT DOCUMENTS

WO    WO 2009/006041 A1    1/2009

OTHER PUBLICATIONS

International Search Report and Written Opinion for PCT/US2014/050948, filed Aug. 13, 2014.

* cited by examiner

*Primary Examiner* — Kenneth Lam (57) ABSTRACT

Systems and methods for allocating reuse codes to cells in a communication network are described. In some embodiments, the systems and methods select a target cell from a group of cells in a telecommunication network, determine one or more reuse code exclusion zones associated with allocating scrambling codes to the selected target cell, and allocate a scrambling code to the selected target cell based on the determined one or more reuse code exclusion zones.

16 Claims, 8 Drawing Sheets

ALLOCATING REUSE CODES TO CELLS IN A COMMUNICATION NETWORK

CROSS-REFERENCES TO RELATED APPLICATIONS

This application claims priority to U.S. Provisional Application No. 61/929,449, filed on Jan. 20, 2014, entitled SYSTEM AND METHODS FOR OPTIMIZING WIRELESS SYSTEM REUSE CODES BASED ON MEASUREMENTS AND REUSE EXCLUSION ZONES, and U.S. Provisional Application No. 61/929,452, filed on Jan. 20, 2014, entitled AUTOMATED METHOD FOR RESOLVING SCRAMBLING CODE AMBIGUITIES IN WIRELESS ACCESS NETWORKS which are hereby incorporated by reference in their entirety.

BACKGROUND

Wireless networks rely on a large number of individual base stations or cells to provide high capacity wireless services over large coverage areas, such as market areas (e.g., cities), surrounding residential areas (e.g., suburbs, counties), highway corridors and rural areas. Continuous radio connectivity across these large coverage areas is accomplished via user mobility from one base station to others as the user traverses the network's operating area. High reliability mobility in mobile wireless networks minimizes the number of dropped calls or other abnormal discontinuations of radio service to the supported users.

Modern broadband wireless access technologies, such as the Universal Mobile Telecommunication System (UMTS), High Speed Packet Access (HSPA), Long Term Evolution (LTE), and so on, rely on the reuse of a finite number of codes, which are used by mobile devices to differentiate signals originating from different base stations in a network. These codes, such as 3G scrambling codes or 4G PCI codes, are reused multiple times across wide area networks, often with the same code being allocated to multiple base stations in the networks.

Suboptimal allocation of these codes may result in insufficient radio frequency isolation between two base stations that utilize the same code, leading to problems with network performance and high reliability mobility within the network. For example, suboptimal allocation of codes may lead to code ambiguities and/or excessive interference to mobile devices operating in areas where signals from two or more base stations utilizing the same code are received at sufficient strength and confusion and/or excessive interference at the mobile device.

The common reuse of codes include code reuse planning prior to network deployment, which attempts to minimize code reuse conflicts and ensure sufficient reuse distances between two or more wireless base stations utilizing the same code. Often, reuse planning relies on radio frequency path loss and inter-cell radio frequency isolation estimates, which can be erroneous and misleading when compared to the actual isolation between actual cells. In addition, reuse planning is often insufficient in allocating codes during network evolution and/or the addition of new cells into an established network, resulting in increased code reuse conflicts over time and degraded network performances, among other drawbacks.

SUMMARY

Systems and methods for allocating reuse codes to cells in a communication network are described. In some embodiments, the systems and methods select a target cell from a group of cells in a telecommunication network, determine one or more reuse code exclusion zones associated with allocating scrambling codes to the selected target cell, and allocate a scrambling code to the selected target cell based on the determined one or more reuse code exclusion zones.

For example, the systems and method may determine the reuse code exclusion zones by collecting first neighbor cell information and first measurement report information for the selected target cell, determining a first exclusion zone of neighboring cells and interfering cells based on the collected first neighbor cell information and first measurement report information, collecting second neighbor cell information and second measurement report information for each of the neighboring cells and interfering cells associated with the determined first exclusion zone, and determining a second exclusion zone of cells that are neighbors to the neighboring cells associated with the first exclusion zone and cells that are interferers of the neighboring cells associated with the first exclusion zone based on the collected second neighbor cell information and second measurement report information.

In some embodiments, the systems and methods include a selection module that selects a target cell from a group of cells in a telecommunication network, a cell exclusion module that determines one or more reuse code exclusion zones associated with allocating scrambling codes to the selected target cell, and a code allocation module that allocates a scrambling code to the selected target cell based on the determined one or more reuse code exclusion zones.

In some embodiments, the systems and methods, for each cell in a telecommunications network, determine one or more reuse code exclusion zones associated with allocating scrambling codes to the cell, the exclusion zones including cells that are neighbors of the cell and cells that are interferers to the cell, and allocate a scrambling code to the cell from another cell outside of the determined one or more reuse code exclusion zones.

DETAILED DESCRIPTION

Systems and methods for optimizing the reuse of codes (e.g., scrambling codes) in a network are described. In some embodiments, the systems and methods utilize mobile station reports, base station configuration parameters, reuse distance criteria, and/or other network information, determine code reuse exclusion zones based on the information for cells in the network, and allocate scrambling codes to the cells based on the determined code reuse exclusion zones.

For example, a code allocation system may determine, for the cells in a telecommunication network, one or more reuse code exclusion zones of other cells in the network, and allocate scrambling codes to the cells based on the exclusion zones, such as by reusing codes previously used by cells not included and/or located in the exclusion zones. The code allocation system, by creating code reuse exclusion zones for cells, may therefore optimize the reuse of scrambling codes within a network by minimizing or preventing the shared use of a scrambling code by two or more cells that may, at some point in time, communicate with a single mobile device simultaneously or otherwise interfere with one another.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

Figure 1:
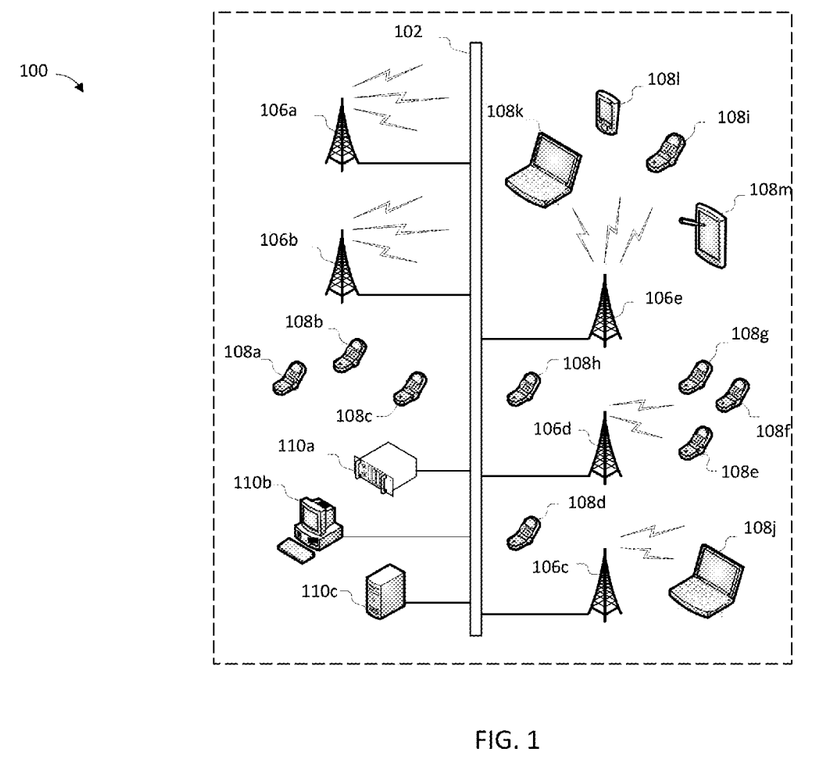
FIG. 1 is a block diagram illustrating a suitable network environment.

FIG. 1 illustrates an example network environment 100 within may include a code allocation system configured to allocate scrambling codes to cells within the network environment 100. Any of the machines, databases, or devices shown in FIG. 1 and other Figures described herein may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices.

As depicted, the network environment 100 includes a data communications network 102, one or more base stations or cells 106a-e, one or more network resource controllers 110a-c, and one or more User Equipment (UE) 108a-m, such as mobile or other computing devices. As used herein, the term "base station" refers to a wireless communications station provided in a location that serves as a hub of a wireless network. The base stations may be used with macrocells, microcells, picocells, and femtocells.

The data communications network 102 may include a backhaul portion that can facilitate distributed network communications between any of the network controller devices 110a-c and any of the base stations 106a-e. Any of the network controller devices 110a-c may be a dedicated Network Resource Controller (NRC) that is provided remotely from the base stations or provided at the base station, and may include a rollback system and/or components of a rollback system. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations.

The backhaul portion of a data communications network 102 may include intermediate links between a backbone of the network, which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In some embodiments, the NRC has presence and functionality that may be defined by the processes it is capable of carrying out. Accordingly, the conceptual entity that is the NRC may be generally defined by its role in performing processes associated with embodiments of the present disclosure. Therefore, the NRC entity may be considered to be either a hardware component and/or a software component that is stored in computer readable media such as volatile or non-volatile memories of one or more communicating device(s) within the networked computing system 100.

In some embodiments, any of the network controller devices 110a-c and/or base stations 106a-e may function independently or collaboratively to implement processes associated with various embodiments of the present disclosure described herein. Further, processes for dynamically optimizing network elements of a network, such as newly added network element, may be carried out via various communication protocols, such as those associated with modern Global Systems for Mobile (GSM), Universal Mobile Telecommunications System (UMTS), Long Term Evolution (LTE) network infrastructures, and so on.

In accordance with a standard GSM network, any of the network controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In some embodiments, any of the network controller devices 110a-c, the base stations 106a-e, as well as any of the UE 108a-m may be configured to run various operating systems, such as Microsoft® Windows®, Mac OS®, Google® Chrome®, Linux®, Unix®, or any mobile operating system, including Symbian®, Palm®, Windows Mobile®, Google® Android®, Mobile Linux®, and so on. Any of the network controller devices 110a-c, or any of the base stations 106a-e may employ any number of common server, desktop, laptop, and personal computing devices.

In some embodiments, any of the UE 108a-m may be associated with any combination of common mobile computing devices (e.g., laptop computers, tablet computers, cellular phones, handheld gaming units, electronic book devices, personal music players, MiFi™ devices, video recorders, and so on), having wireless communications capabilities employing any common wireless data communications technology, including, but not limited to: GSM, UMTS, 3GPP LTE, LTE Advanced, WiMAX, and so on.

In some embodiments, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments described herein, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
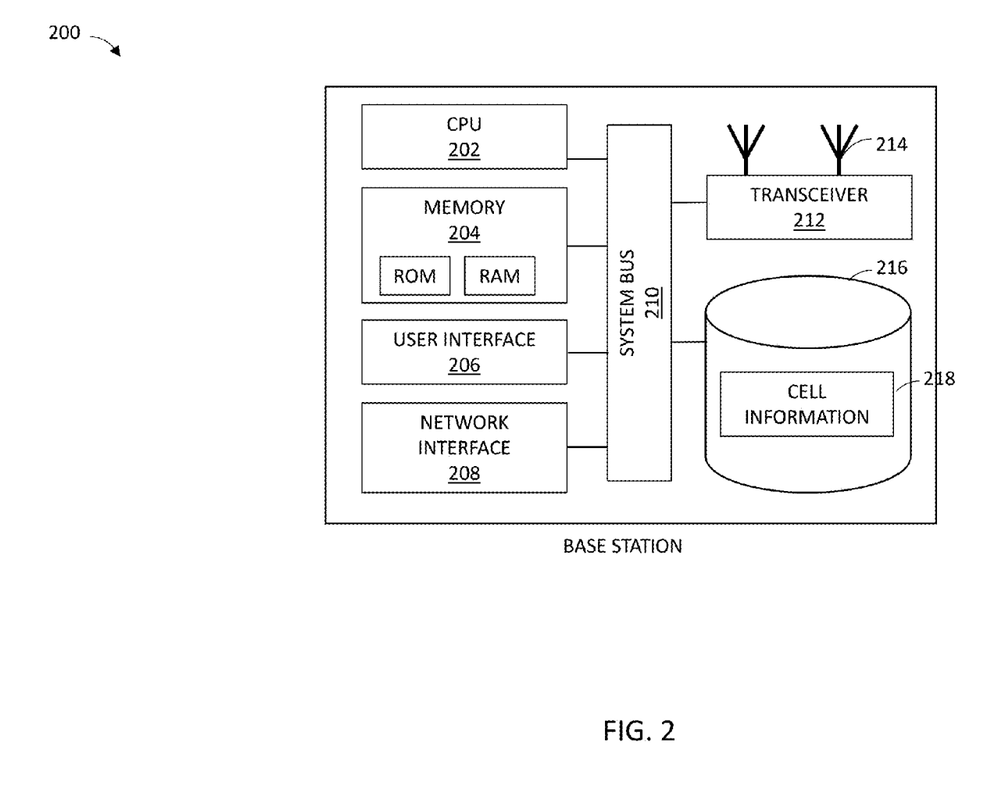
FIG. 2 is a block diagram illustrating a network resource controller.

FIG. 2 illustrates a block diagram of a base station or cell 200 (e.g., a cell, femtocell, picocell, microcell or macrocell) that may be representative of the base stations 106a-e in FIG. 1. In some embodiments, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

The base station 200 may include a user interface 206 for inputting and retrieving data to and from the base station by operator personnel, and a network interface 208 coupled to a wireline portion of the network. Meanwhile, the base station 200 wirelessly sends and receives information to and from UE through a transceiver 212, which is equipped with one or more antenna 214.

The base station 200 may further include a system bus 210 and data storage 216. The system bus facilitates communication between the various components of the base station 200. For example, the system bus 210 may facilitate communication between a program stored in data storage 216 and the CPU 202, which executes the program. In some embodiments, data storage 216 may store information or parameters 218 for the base station 200, such as parameters identifying the geographical or network location of the base station 200, parameters identifying one or more carrier frequencies or operating bands via which the base station 200 operates, parameters identifying hierarchical relationships within the network between the base station 200 and other base stations (e.g., between the base station and neighboring cells), parameters associated with load-balancing or other performance metrics, parameters associated with a position, tilt, and/or geometry of an antenna, information identifying a currently or previously assigned scrambling codes, and so on. In addition, data storage 216 may include an operating system, and various programs related to the operation of the base station 200.

As an example, in Radio Access Network Operational Support Systems (RAN OSSs), configuration data is typically stored in Managed Objects (MOs). Each MO can be retrieved when its Distinguished Name (DN) is known. MOs are often associated with physical or logical entities within the network. For example, a UtranCell MO may be associated with a logical UMTS cell, such as a UMTS base station. Each MO may have or be associated with multiple configurable parameters (e.g., a UtranCell MO may have associated parameters such as transmit power, handover offsets, or other described herein.).

At various times, changes are made to the MOs and/or parameters associated with the MOs. For example, some changes that may be applied to MOs and/or MO parameters include "update" type changes, where or more configurable parameters in the MO are changed, "add" type changes, where a new MO is added to the network, "delete" type changes, where an MO is deleted from the network, and so on.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, and so on) to send and receive information to and from UE through the transceiver 212. Additionally, the base station 200 may be configured to communicate with UEs 108a-m via any Cellular Data Communications Protocol, including any common GSM, UMTS, WiMAX or LTE protocol.

Figure 3:
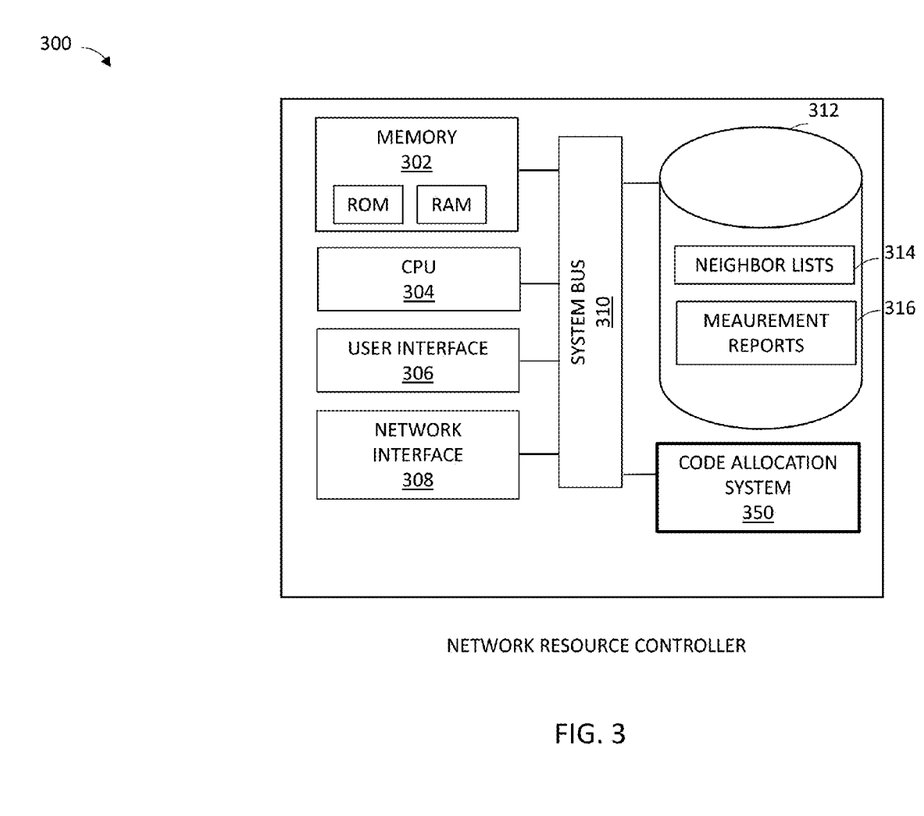
FIG. 3 is a block diagram illustrating a base station or cell.

FIG. 3 illustrates a block diagram of an NRC 300 that may be representative of any of the network controller devices 110a-c. In some embodiments, one or more of the network controller devices 110a-c are self-optimizing or self-organizing network (SON) controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, and so on. Based on the functionality provided by an NRC, the storage device of such a computer serves as a repository for software and database thereto.

The CPU 304 is responsible for executing computer programs stored on volatile (RAM) and nonvolatile (ROM) memories 302 and a storage device 312 (e.g., HDD or SSD). In some embodiments, the storage device 312 may store program instructions as logic hardware such as an ASIC or FPGA. The storage device 312 may include neighbor list information 314, measurement report information 316, and other information associated with the components and/or configuration of components within the network environment 100.

In some embodiments, the NRC includes a code allocation system 350 configured to reuse and allocate or otherwise assign codes to the base stations 106-e within the network environment 100. For example, the code allocation system 350 may utilize the cell information 218, the neighbor list information 314, the measurement report information 316, and/or other network to determine reuse code exclusion zones for the cells 106a-e within the network environment 100, and allocate scrambling codes to the cells 106a-e based on the determined exclusion zones.

Thus, in some embodiments, the code allocation system 350 optimizes the allocation of reuse codes for the network environment 100 or individual cells 106a-e within the network environment 100 based on historical network performance measurements, base station parameters, operator defined reuse distance criteria, and so on, enabling a real-time optimization of code reuse allocations within the network environment 100 and supporting a dynamic large scale or cell targeted optimization of reuse codes over time as the network environment 100 evolves and new cells are added to the network environment 100.

In some embodiments, the code reuse optimization process and methods described herein and performed by the code allocation system 350 may be applied to any wireless network that (1) utilizes a limited set of cell identification codes that are reused across the cells of the network and/or (2) supports high mobility concepts and protocols, such as cell neighbor lists (e.g., neighbor relation tables) and signal measurement reports (e.g., detected set reporting). Example networks include 3G spread spectrum based systems that rely on reused scrambling codes, or 4G OFDM based systems that rely on reused PCI codes.

Examples of Allocating Codes to Cells in a Network

Figure 4:
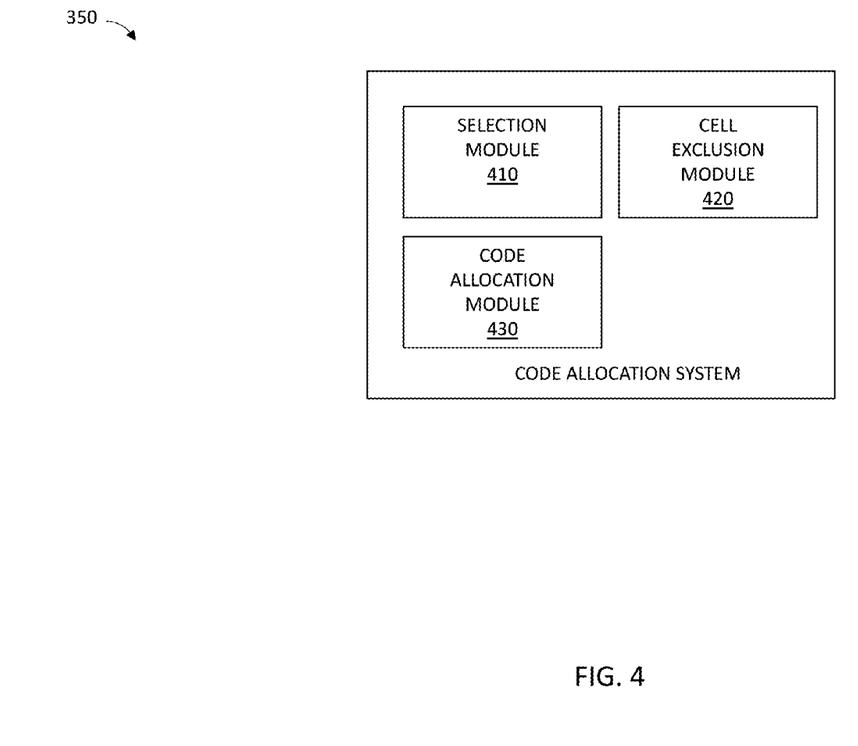
FIG. 4 is a block diagram illustrating the components of a code allocation system configured to allocate reuse codes to cells in a communication network.

As described herein, in some embodiments, the code allocation system assigns scrambling codes to cells in a network by identifying other cells to be excluded from using the scrambling codes. FIG. 4 is a block diagram illustrating the components of the code allocation system 350, which allocates reuse codes to cells in a communication network.

The code allocation system 350 may include one or more modules and/or components to perform one or more operations of the code allocation system 350. The modules may be hardware, software, or a combination of hardware and software, and may be executed by one or more processors. For example, the code allocation system 350 may include a selection module 410, a cell exclusion module 420, and a code allocation module 430.

In some embodiments, the selection module 410 is configured and/or programmed to select a target cell from a group of cells in a telecommunication network. The selection module 410 may select any or all cells during the reuse of all codes within the network, may select one or more cells based on identified problems or performance issues with the cell or cells, may select a newly added cell or cells, and so on.

In some embodiments, the cell exclusion module 420 is configured and/or programmed to determine one or more reuse code exclusion zones associated with allocating scrambling codes to the selected target cell. A reuse code exclusion zone may be a zone or group of cells proximate to or interfering with the target cell, such as a zone of neighboring cells or interfering cells. For example, the cell exclusion module 420 may determine a first exclusion zone of neighboring cells and interfering cells to the selected target cell, and determine a second exclusion zone of cells that are neighbors to the neighboring cells associated with the first exclusion zone and cells that are interferers of the neighboring cells associated with the first exclusion zone.

As described herein, the cell exclusion module 420 may determine and/or select cells to be added to a reuse code exclusion zone based on network information, such as neighbor list information 314 that identifies neighboring cells in a network, measurement report information 316 that identifies various performance characteristics of the network, such as characteristics associated with interferences metrics between cells in the network, and so on.

The cell exclusion module 420, in some embodiments, may collect first neighbor cell information and first measurement report information for the selected target cell, determine a first exclusion zone of neighboring cells and interfering cells based on the collected first neighbor cell information and first measurement report information, collect second neighbor cell information and second measurement report information for each of the neighboring cells and interfering cells associated with the determined first exclusion zone, and determine a second exclusion zone of cells that are neighbors to the neighboring cells associated with the first exclusion zone and cells that are interferers of the neighboring cells associated with the first exclusion zone based on the collected second neighbor cell information and second measurement report information.

Thus, the cell exclusion module 420 may identify any cells that are neighbors to the selected target cell, any cells that are neighbors to the neighbors of the selected target cell, any cells that interfere with the selected target cell, and/or any cells that interfere with the neighbors of the selected target cell, and build, generate, and/or otherwise determine one or more exclusion zones for the selected target cell that include some or all of the identified cells.

In some embodiments, the code allocation module 430 is configured and/or programmed to allocate a scrambling code to the selected target cell based on the determined one or more reuse code exclusion zones. For example, the code allocation module 430 may allocate a scrambling code from another cell outside of the determined reuse code exclusion zones, and may not allocate a scrambling code from a cell within the reuse code exclusion zones.

In some embodiments, the code allocation module 430 may select or allocate a scrambling code associated with a cell that is located outside of the reuse code exclusion zone and at a predetermined minimum distance from a location of the selected target cell. For example, the code allocation module 430 may access a minimum distance parameter, and allocate codes assigned to cells that are outside of the determined exclusion zones and located at a distance greater than the minimum distance parameter (e.g., when a distance parameter is 6 kilometers, the code allocation module 430 allocates codes from cells located at least 6 km from the target cell).

Thus, the code allocation module 430 may allocate a scrambling code to the selected target cell by generating a list of candidate cells not associated with the one or more reuse code exclusion zones, updating the list of candidate cells by removing any candidate cells on the list of candidate cells that are located within a predetermined minimum distance to a location of the selected target cell, and allocating a scrambling code to the selected target cell that is associated with a cell on the updated list of candidate cells (e.g., a cell outside of the exclusion zone and located at a distance above a threshold distance).

Figure 5:
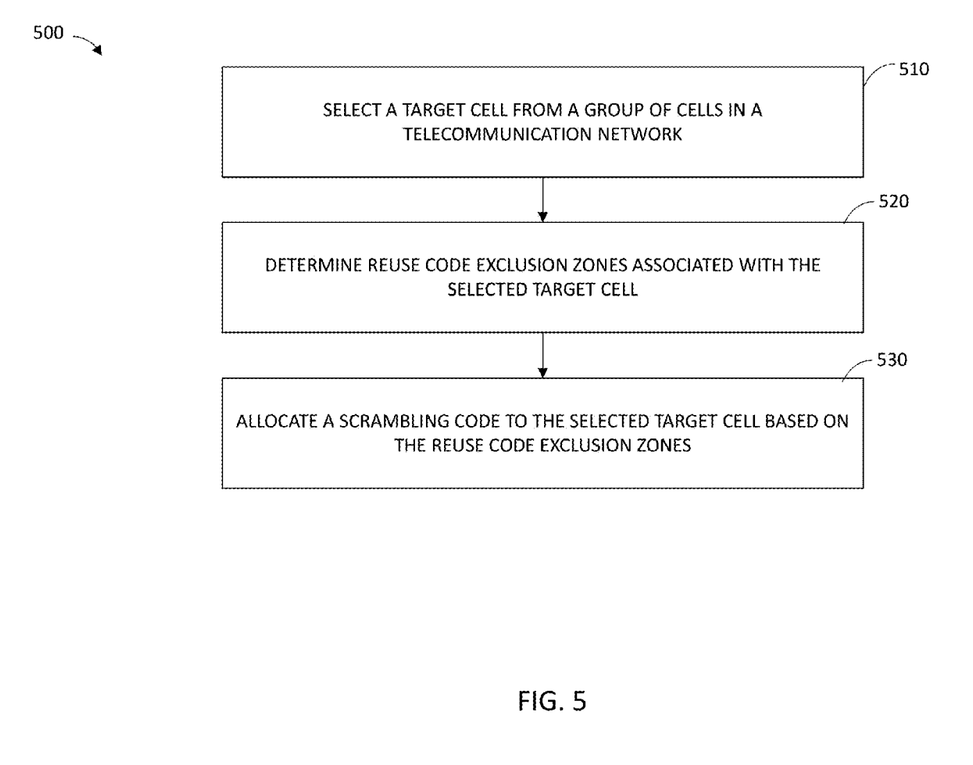
FIG. 5 is a flow diagram illustrating a method for allocating reuse codes to cells in a communication network.

As described herein, the code allocation system 350 may perform various algorithms, routines, and/or methods when assigning a limited set of reuse codes to a large number of cells in a network. FIG. 5 is a flow diagram illustrating a method 500 for allocating codes to cells in a communication network. The method 500 may be performed by the code allocation system 350 and, accordingly, is described herein merely by way of reference thereto. It will be appreciated that the method 500 may be performed on any suitable hardware.

In operation 510, the code allocation system 350 selects a target cell from a group of cells in a telecommunication network. For example, the selection module 410 may select any or all cells during the reuse of all codes within the network, may select one or more cells based on identified problems or performance issues with the cell or cells, may select a newly added cell or cells, and so on.

In operation 520, the code allocation system 350 determines one or more reuse code exclusion zones associated with allocating scrambling codes to the selected target cell. For example, the cell exclusion module 420 may determine a first exclusion zone of neighboring cells and interfering cells to the selected target cell, and determine a second exclusion zone of cells that are neighbors to the neighboring cells associated with the first exclusion zone and cells that are interferers of the neighboring cells associated with the first exclusion zone.

Figure 6:
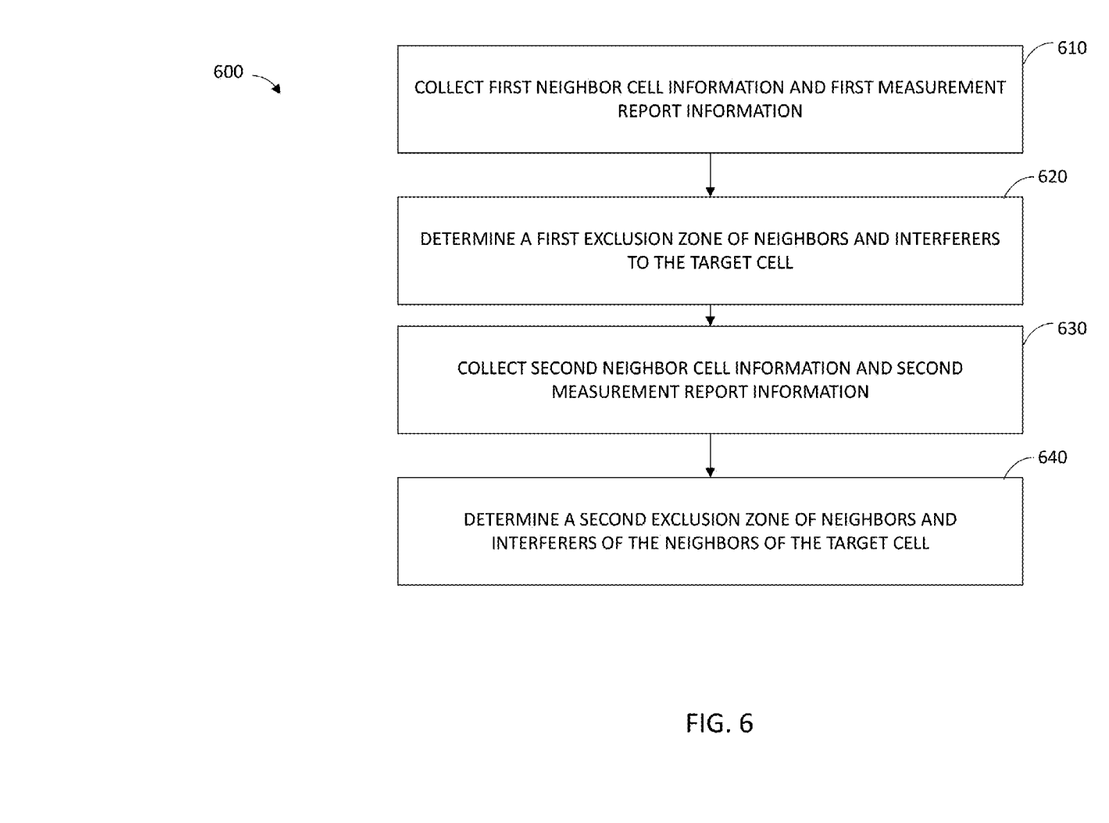
FIG. 6 is a flow diagram illustrating a method for determining reuse code exclusion zones for a target cell in a network.

FIG. 6 is a flow diagram illustrating a method 600 for determining reuse code exclusion zones for a target cell in a network. The method 600 may be performed by the code allocation system 350 and, accordingly, is described herein merely by way of reference thereto. It will be appreciated that the method 500 may be performed on any suitable hardware.

In operation 610, the code allocation system 350 collects first neighbor cell information and first measurement report information for the selected target cell. For example, the code allocation system 350 collects neighbor list information 314 and measurement report information 316 for all cells associated with the target cell.

Figure 7:
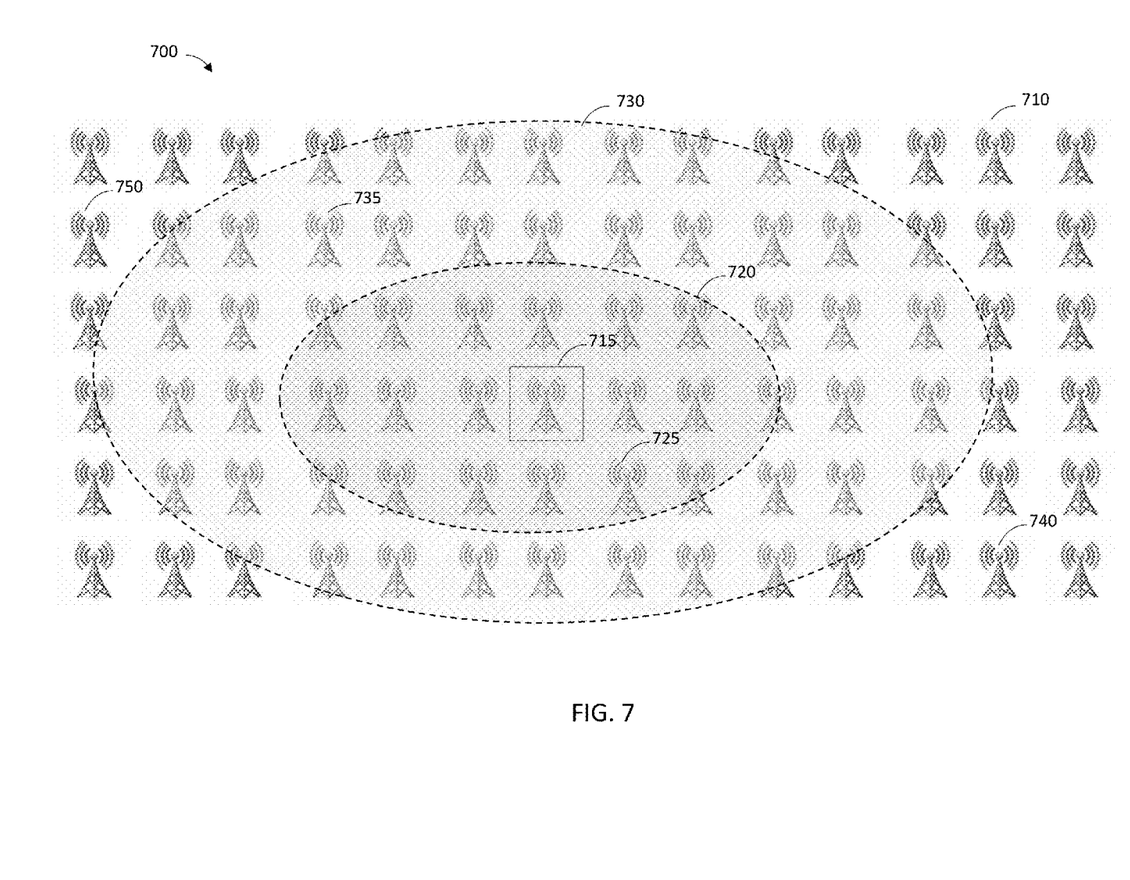
FIG. 7 is a diagram illustrating exclusion zones determined for a target cell in a network.

In operation 620, the code allocation system 350 determines a first exclusion zone of neighboring cells and interfering cells based on the collected first neighbor cell information and first measurement report information. FIG. 7 is a diagram illustrating exclusion zones in a network 700 of cells 710 that are determined for a target cell 715 in a network. As depicted in FIG. 7, the code allocation system 350 determines a first exclusion zone 720 of cells, such as cells (e.g., cell 725) identified as neighbors or interferers with the selected target cell 715.

Returning back to FIG. 6, the code allocation system 350, in operation 630, collects second neighbor cell information and second measurement report information for each of the neighboring cells and interfering cells associated with the determined first exclusion zone. For example, the code allocation system 350 collects neighbor list information 314 and measurement report information 316 for all cells associated with the neighbors of the target cell (e.g., some or all cells within exclusion zone 720).

In operation 640, the code allocation system 350 determines a second exclusion zone of cells that are neighbors to the neighboring cells associated with the first exclusion zone and cells that are interferers of the neighboring cells associated with the first exclusion zone based on the collected second neighbor cell information and second measurement report information. As depicted in FIG. 7, the code allocation system 350 determines a second exclusion zone 730 of cells, such as cells (e.g., cell 735) identified as neighbors or interferers with the neighbor cells (e.g., cell 725) of the selected target cell 715.

Thus, the cell exclusion module 420 may identify any cells that are neighbors to the selected target cell, any cells that are neighbors to the neighbors of the selected target cell, any cells that interfere with the selected target cell, and/or any cells that interfere with the neighbors of the selected target cell, and build, generate, and/or otherwise determine one or more exclusion zones (e.g., zones 720 and/or 730 in FIG. 7) for the selected target cell that include some or all of the identified cells.

Returning back to FIG. 5, the code allocation system 350, in operation 530, allocates a scrambling code to the selected target cell based on the determined one or more reuse code exclusion zones. For example, the code allocation module 430 may allocate a scrambling code from another cell outside of the determined reuse code exclusion zones, such as cell 740 or cell 750 of FIG. 7, and may not allocate a scrambling code from a cell within the reuse code exclusion zones.

In some embodiments, the code allocation module 430 may select or allocate a scrambling code associated with a cell that is located outside of the reuse code exclusion zone and at a predetermined minimum distance from a location of the selected target cell. For example, the code allocation module 430 may access a minimum distance parameter, and allocate codes assigned to cells that are outside of the determined exclusion zones and located at a distance greater than the minimum distance parameter (e.g., when a distance parameter is 6 kilometers, the code allocation module 430 allocates codes from cells located at least 6 km from the target cell). Thus, the code allocation module 430 may assign a scrambling code to the selected target cell that is not located in the reuse code exclusion zones and outside of a minimum distance associated with the reuse of codes in the network.

The systems and methods, therefore, may, for one or more cells in a telecommunications network, determine one or more reuse code exclusion zones associated with allocating scrambling codes to the cell, the exclusion zones including cells that are neighbors of the cell and cells that are interferers to the cell, and allocate a scrambling code to the cell from another cell outside of the determined one or more reuse code exclusion zones, among other things.

Examples of Retuning a Network

As described herein, the code allocation system 350 may perform certain processes and methods to reuse identification codes for cells in a network. As an example, the following process illustrates the operation performed by the code allocation system 350 when retuning a network of cells:

Using input parameters of:

> RESERVE_SC (DEFAULT = 25)
> SC_BY_LAYER (DEFAULT = YES)
> DSR_DURATION (DEFAULT = 7 DAYS)
> RESERVE_SC (DEFAULT = 25)
> EcNo_Threshold (DEFAULT = −17 dBm)
> RSCP_Threshold (DEFAULT = −106 dBm)
> DSR_Counts (Default = 100)
> HO_DURATION (DEFAULT = 7 DAYS)
> Neighbor_Counts (Default = 100)
> Distance_Threshold (Default = 6 km), Determine the number of reserved scrambling codes (out of 512) that will be reserved for new cells, indoor cells and/or problem cells. The remainder (512—Reserve_SC) is the available set of scrambling codes for use. RESERVE_SC (DEFAULT=25), Determine if scrambling code plan will be identical for each UMTS frequency layer, or if separate plans will be used per frequency layer. Identical plans may result in the same scrambling code being assigned to the cells on each frequency layer that are part of the same sector. SC_BY_LAYER (DEFAULT=YES), Determine the days used for detected set reports and handover reports. DSR_DURATION (DEFAULT=7 DAYS). HO_DURATION (DEFAULT=7 DAYS), Determine the Average EcNo, Average RSCP, and count thresholds to determine interferers from the detected set reports. Use intra-frequency handover neighbor counts to filter list. Some mobile wireless networks may only report handover counts for cells that are on existing neighbor lists. Other mobile wireless networks may report handover counts for cells that are not on the neighbor list of a source cell, but that are added because of the creation of composite neighbor lists due to soft handover. EcNo_Threshold (DEFAULT=−17 dB). RSCP_Threshold (DEFAULT=−106 dBm). DSR_Counts (Default=100). Neighbor_Counts (Default=100), Determine the distance threshold within which scrambling code reuse is not allowed, as a safety precaution for indoor, subway or other microcells that do not typically see interferers or have very low counts. Distance_Threshold (Default=6 km), Perform the following for each cell as a target cell:

Create a first exclusion zone by considering all neighbor cells and interferers of the target cell (applying thresholds from herein). There will be no re-use of Cell A's scrambling code for any cells that fit this criteria, Create a second exclusion zone by considering the neighbors and interferers of all the neighbors and interferers of the target cell. There will be no re-use of Cell A's scrambling code for any cells in this zone. In cases where there are no cells left (all candidate cells for reuse are eliminated), flag the target cell and/or restart the operation.

Before the non-excluded list of candidate cells for reuse with the target cell can be used, eliminate or remove cells that are still candidates for reuse with the target cell but fall within the distance threshold. In cases where there are no cells left (all candidate cells for reuse are eliminated), flag the target cell and/or restart the operation, Store the list of available reuse cells for the target cell in an array, $a_i$, Repeat for all cells in the market, i=1 to N, where N=total number of cells per layer, In cases where SC_BY_LAYER=NO, then the same scrambling code plan is used for each frequency layer in a sector and the candidate cells for reuse for all frequency layer of the sector are to be combined. For that sector, which involves two, three, or four frequency layers, go ahead and filter the subset of cells in that are common to all three layers, E.g., Physical Sector 7WDC013A1 has cells P7WDC013A11, U7WDC013A11, and U7WDC013A12, each cell operating on a different frequency (e.g., there are three frequency layers for this sector), P7WDC013A11 has three cells that could be reused P7WDC001A11, P7WDC085A31, P7WAC400A21, U7WDC013A11 has three cells that could be reused U7WDC001A11, U7WDC085A31, U7WDC801A11, U7WDC013A12 has three cells that could be reused U7WDC001A12, U7WDC085A32, U7WAC400A22, and the final candidate cells for reuse with 7WDC013A1 using the common layer SC plan would be 7WDC001A1 and 7WDC085A3.

Figure 8:
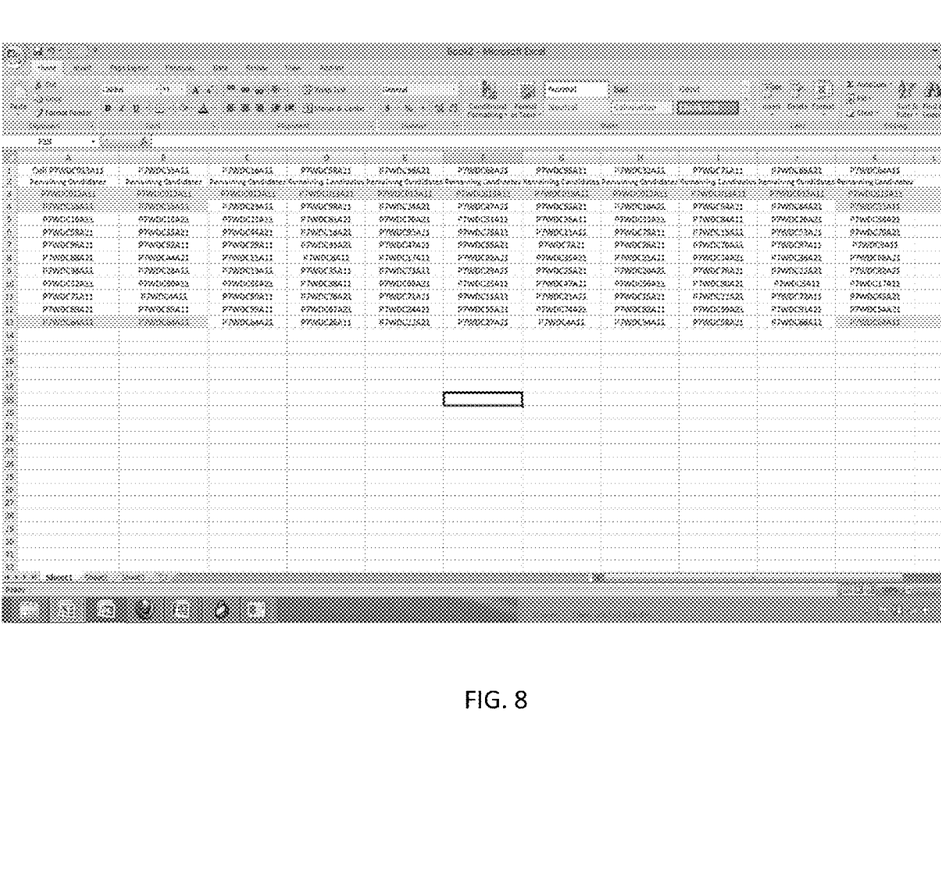
FIG. 8 is a table illustrating a matrix for determining reuse partner cells for a target cell.

Once the above steps have been completed, proceed with optimization for one of the frequency layers, fl. Choose the cell in the market that has the largest exclusion list, such as cell i. Assign a scrambling code 0 to cell i, For cell i, identify all available reuse candidate cells ($a_i$) from herein and for each candidate cell determine their available reuse candidate cells. Ensure that each cell includes itself as a candidate. Matrix $I_i$ which maps reuse partner cells to target cells, is depicted in FIG. 8, For matrix $I_i$ the maximum number of reused cells may be chosen from candidates on one another's lists. For example, there are two other cells that can be chosen as scrambling code re-use partners to P7WDC013A11, cell P7WDC55A11 and cell P7WDC64A11. All three cells are assigned scrambling code=0. All three cells would be eliminated from any remaining cell's candidate arrays $a_i$. If there is a tie with possible reuse partners, the final set can be arbitrarily decided, Choose the next cell in the market with the largest exclusion list, create a new matrix $I_2$ and choose the maximum number of reuse cells that are candidates on one another's lists, Repeat until all cells have been assigned a scrambling code up to 512—RESERVE_SC. If optimal thresholds and parameters are assigned, then there should be an ample number of scrambling codes from which to choose, When there are not enough scrambling codes then thresholds should be tightened or modified, and the operation is repeated, Determine if SC_BY_LAYER=YES, then the operation is repeated for the additional frequency layers. Note that in this case, different reuse plans will result for each frequency layer. Examples of Retuning a Problem Cell in a Network In some embodiments, the code allocation system 350 may also perform various operations to problem cells within an existing scrambling code plan, and may be useful in recalibrating a network or cells without retuning an entire network. As an example, the following process illustrates the operation performed by the code allocation system 350 when retuning a network of cells:

If the market uses the same scrambling code plan for all frequency layers on a sector, identify the sector/layer with the worst or least desirable performance and optimize for this cell, by:

Building an exclusion zone of scrambling codes for the target cell,

Identifying and excluding the scrambling codes for each of the neighbor cells,

Using the DSR_Duration (Default=7 Days), exclude any scrambling codes that show up on a DSR report for the target cell, Excluding any scrambling codes that are reserved, and For the target cell, choosing the scrambling code (e.g., not on exclusion list or reserved list) with the greatest reuse distance to the target cell.

Of course, other scenarios and/or implementations are possible and supported by the code allocation system 350 described herein.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method, comprising:
    selecting a target cell from a group of cells in a telecommunication network;
    determining one or more reuse code exclusion zones associated with allocating scrambling codes to the selected target cell by:
        determining one or more reuse code exclusion zones by determining first neighbor cells on a neighbor list of the target cell; and
        determining second neighbor cells that are on neighbor lists of the first neighbor cells, wherein the at least one reuse code exclusion zone includes the first neighbor cells and the second neighbor cells; and
    allocating a scrambling code to the selected target cell based on the determined one or more reuse code exclusion zones.

2. The method of claim 1, wherein determining one or more reuse code exclusion zones associated with the selected target cell includes:
    collecting first neighbor cell information and first measurement report information for the selected target cell;
    determining a first exclusion zone of neighboring cells and the plurality of cells that cause RF interference to the target cell based on the collected first neighbor cell information and first measurement report information;
    collecting second neighbor cell information and second measurement report information for each of the neighboring cells and interfering cells associated with the determined first exclusion zone; and
    determining a second exclusion zone of cells that are neighbors to the neighboring cells associated with the first exclusion zone and cells that cause RF interference to the neighboring cells associated with the first exclusion zone based on the collected second neighbor cell information and second measurement report information.

3. The method of claim 1, wherein determining one or more reuse code exclusion zones associated with the selected target cell includes:
    determining a first exclusion zone of neighboring cells and the plurality of cells that cause RF interference to the selected target cell; and
    determining a second exclusion zone of cells that are neighbors to the neighboring cells associated with the first exclusion zone and cells that cause RF interference to the neighboring cells associated with the first exclusion zone.

4. The method of claim 1, wherein determining one or more reuse code exclusion zones associated with the selected target cell further comprises identifying cells that cause RF interference above a predetermined level to the selected target cell.

5. The method of claim 1, wherein allocating a scrambling code to the selected target cell includes selecting a scrambling code associated with a cell that is located at a predetermined minimum distance from a location of the selected target cell.

6. The method of claim 1, wherein allocating a scrambling code to the selected target cell based on the determined one or more reuse code exclusion zones includes:
    generating a list of candidate cells not associated with the one or more reuse code exclusion zones;
    updating the list of candidate cells by removing any candidate cells on the list of candidate cells that are located within a predetermined minimum distance to a location of the selected target cell; and
    allocating a scrambling code to the selected target cell that is associated with a cell on the updated list of candidate cells.

7. The method of claim 1, wherein determining one or more reuse code exclusion zones associated with allocating scrambling codes to the selected target cell includes:
    accessing neighbor list information and measurement report information for the cells in the telecommunication network;
    accessing distance information for the cells in the telecommunication network; and
    identifying a group of cells to exclude based on the accessed information.

8. The telecommunications system of claim 1, wherein allocating a scrambling code to the selected target cell includes selecting a scrambling code associated with a cell that is located at a predetermined minimum distance from a location of the selected target cell.

9. The telecommunications system of claim 1, wherein allocating a scrambling code to the selected target cell based on the determined one or more reuse code exclusion zones includes:
    generating a list of candidate cells not associated with the one or more reuse code exclusion zones;
    updating the list of candidate cells by removing any candidate cells on the list of candidate cells that are located within a predetermined minimum distance to a location of the selected target cell; and
    allocating a scrambling code to the selected target cell that is associated with a cell on the updated list of candidate cells.

10. The telecommunications system of claim 1, wherein determining one or more reuse code exclusion zones associated with allocating scrambling codes to the selected target cell includes:
    accessing neighbor list information and measurement report information for the cells in the telecommunication network;
    accessing distance information for the cells in the telecommunication network; and
    identifying a group of cells to exclude based on the accessed information.

11. A non-transitory computer-readable storage medium whose contents, when executed by a computing system, cause the computing system to perform operations, the operations comprising:
    selecting a target cell from a group of cells in a telecommunication network;
    determining one or more reuse code exclusion zones associated with allocating scrambling codes to the selected target cell by:
        determining one or more reuse code exclusion zones by determining first neighbor cells on a neighbor list of the target cell; and determining second neighbor cells that are on neighbor lists of the first neighbor cells, wherein the at least one reuse code exclusion zone includes the first neighbor cells and the second neighbor cells; and allocating a scrambling code to the cell from another cell outside of the determined one or more reuse code exclusion zones.

12. The non-transitory computer-readable storage medium of claim 11, wherein the one or more exclusion zones include cells that are neighbors of the neighbors of the cell and cells that are interferes to the neighbors of the cell.

13. A telecommunications system, comprising:

at least one memory that stores computer executable instructions thereon; and at least one processor that, when executing the computer executable instructions stored on the memory, performs the following method:

determining one or more reuse code exclusion zones associated with allocating scrambling codes to the selected target cell by:

determining one or more reuse code exclusion zones by determining first neighbor cells on a neighbor list of the target cell; and determining second neighbor cells that are on neighbor lists of the first neighbor cells, wherein the at least one reuse code exclusion zone includes the first neighbor cells and the second neighbor cells; and allocating a scrambling code to the selected target cell based on the determined one or more reuse code exclusion zones.

14. The telecommunications system of claim 13, wherein determining one or more reuse code exclusion zones associated with the selected target cell includes:

collecting first neighbor cell information and first measurement report information for the selected target cell;

determining a first exclusion zone of neighboring cells and the plurality of cells that cause RF interference to the target cell based on the collected first neighbor cell information and first measurement report information;

collecting second neighbor cell information and second measurement report information for each of the neighboring cells and interfering cells associated with the determined first exclusion zone; and determining a second exclusion zone of cells that are neighbors to the neighboring cells associated with the first exclusion zone and cells that cause RF interference to the neighboring cells associated with the first exclusion zone based on the collected second neighbor cell information and second measurement report information.

15. The telecommunications system of claim 13, wherein determining one or more reuse code exclusion zones associated with the selected target cell includes:

determining a first exclusion zone of neighboring cells and the plurality of cells that cause RF interference to the selected target cell; and determining a second exclusion zone of cells that are neighbors to the neighboring cells associated with the first exclusion zone and cells that cause RF interference to the neighboring cells associated with the first exclusion zone.

16. The telecommunications system of claim 13, wherein determining one or more reuse code exclusion zones associated with the selected target cell further comprises identifying cells that cause RF interference above a predetermined level to the selected target cell.

* * * * *